(12) United States Patent
Landow

(10) Patent No.: US 9,571,872 B2
(45) Date of Patent: Feb. 14, 2017

(54) SYSTEMS AND METHODS FOR PROCESSING TIMED TEXT IN VIDEO PROGRAMMING

(75) Inventor: Kate Landow, Denver, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 13/523,172

(22) Filed: Jun. 14, 2012

(65) Prior Publication Data
US 2012/0320267 A1 Dec. 20, 2012

Related U.S. Application Data

(60) Provisional application No. 61/497,390, filed on Jun. 15, 2011.

(51) Int. Cl.
| | | |
|---|---|---|
| *H04N 21/4782* | (2011.01) | |
| *H04N 21/262* | (2011.01) | |
| *H04N 21/235* | (2011.01) | |
| *H04N 21/435* | (2011.01) | |
| *H04N 21/81* | (2011.01) | |
| *H04N 7/088* | (2006.01) | |

(52) U.S. Cl.
CPC ...... *H04N 21/26283* (2013.01); *H04N 7/0885* (2013.01); *H04N 21/2353* (2013.01); *H04N 21/435* (2013.01); *H04N 21/8126* (2013.01)

(58) Field of Classification Search
CPC ................................................. H04N 21/4622
USPC .................. 725/112, 132, 136; 348/E13.064
See application file for complete search history.

(56) References Cited

U.S. PATENT DOCUMENTS

| | | | |
|---|---|---|---|
| 2005/0138674 A1* | 6/2005 | Howard et al. | 725/136 |
| 2005/0273840 A1* | 12/2005 | Mitts et al. | 725/136 |
| 2008/0129864 A1 | 6/2008 | Stone et al. | |
| 2008/0282299 A1 | 11/2008 | Koat et al. | |
| 2010/0050222 A1* | 2/2010 | Legallais et al. | 725/112 |
| 2011/0197251 A1* | 8/2011 | Kummer | 725/132 |
| 2013/0027514 A1* | 1/2013 | Cho et al. | 348/43 |

FOREIGN PATENT DOCUMENTS

| | | |
|---|---|---|
| EP | 1530337 A1 | 5/2005 |
| WO | 2005046159 A1 | 5/2005 |
| WO | 2005057920 A1 | 6/2005 |

OTHER PUBLICATIONS

European Patent Office "International Search Report and Written Opinion" mailed Oct. 5, 2012 for International Appln. No. PCT/US2012/042647, filed Jun. 15, 2012.

(Continued)

*Primary Examiner* — Paulos M Natnael
*Assistant Examiner* — Sihar Karwan
(74) *Attorney, Agent, or Firm* — LK Global

(57) ABSTRACT

Systems, devices and methods are described to process timed text that is associated with television or other video programming. Pre-set data that describes the particular format of the timed text that is associated with a program is initially received and stored at the television receiver prior to receiving the program with encoded timed text. The timed text that is associated with the received program is interpreted according to the pre-set data previously stored at the television receiver, and the program with the interpreted timed text is output to a display for presentation to the viewer.

17 Claims, 3 Drawing Sheets

(56) References Cited

OTHER PUBLICATIONS

Figure 1:
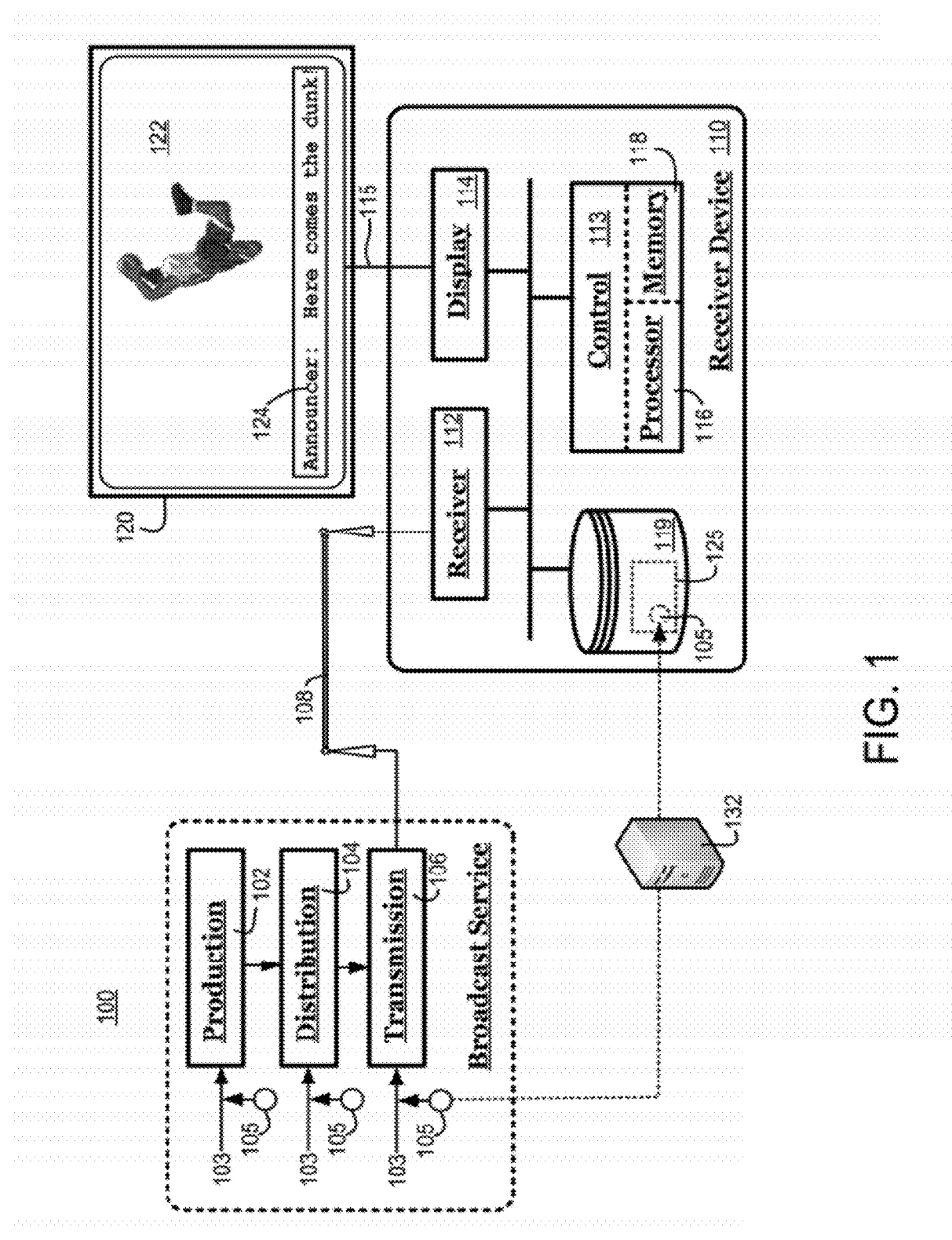

Hans Hoffman "Liaison from SMPTE", 96. MPEG METTING; Mar. 21, 2001-Mar. 25, 2011; Geneva; (Motion Picture Expert Group or ISO/IEC JTC1/SC29/WG11), No. m20160, Mar. 16, 2011, XP030048727, 5.10 "Tunneling CEA-608 Data".
Rey, J.. et al. "RTP Payload Format for 3GPP Timed Text, draft-rey-avt-3gpp-timed-text-01.txt" IETF Internet Draft, XX, XX, Sep. 1, 2003, pp. 1-32, XP002278227.
Japan Patent Office, Notice of Rejection Grounds, dated Dec. 24, 2014 for Japanese Patent Application No. 2014-516028.
State Intellectual Property Office of The People's Republic of China, Office Action for PRC (China) Patent Application No. 201280028862.4 mailed Nov. 1, 2016.

\* cited by examiner

SYSTEMS AND METHODS FOR PROCESSING TIMED TEXT IN VIDEO PROGRAMMING

PRIORITY CLAIM

This application claims priority to U.S. Provisional Patent Application Ser. No. 61/497,390 filed on Jun. 15, 2011, which is incorporated herein by reference.

TECHNICAL FIELD

The following discussion generally relates to the processing of closed captioning or other timed text information associated with television or other video programming.

BACKGROUND

Closed captioning refers to any system that receives, formats, and displays text on a television or other display to thereby allow viewers to access additional or interpretive information about programming content. Closed captions often provide textual transcriptions of the audio portions of programs as the programs progress, thereby allowing the hearing impaired and others to follow the program content without listening to the audio track typically associated with the programming. Motion pictures, video disk (e.g., DVD) content, streamed audio/video, video games and the like may similarly incorporate closed captions using any number of standard or non-standard techniques.

Federal law mandates that all broadcast television programming in the United States must include closed caption information. For conventional digital (e.g., ATSC) television broadcasts, caption streams are typically encoded in a well-known format such as EIA-608 format, EIA-708 format, and/or the like. Other closed captioning formats or standards may be implemented in the United States or elsewhere.

As more and more consumers receive their television programming from broadband sources, the Society of Motion Picture and Television Engineers (SMPTE) and others have recommended a transition from the older standards (e.g., EIA 608/708) to more advanced "timed text" formats such as SMPTE-TT. This newer timed text format incorporates syntax, structures and tags similar to the extensible markup language (XML) to provide more advanced features and to improve flexibility in comparison to the more traditional legacy formats. The SMPTE-TT format is described in SMPTE Standard ST 2052-1-2010, which was approved on Dec. 3, 2010 and is incorporated herein by reference.

Transitioning from legacy formats to timed text formats can create a number of issues in practice. First, incorporating legacy data (e.g., EIA 608/708 data) into timed text formats can be a challenge. Although the SMPTE-TT standard indicates a desire to support legacy formats, it does not presently provide guidance as to how this is to be accomplished. Moreover, challenges can arise in providing timed text within live broadcasts for reasons described more fully below.

It is therefore desirable to provide systems, devices and/or processes that ease the transition from legacy formatting to the newer timed text formats, and that support timed text within live television broadcasts. These and other desirable features and characteristics will become apparent from the subsequent detailed description and the appended claims, taken in conjunction with the accompanying drawings and this background section.

BRIEF SUMMARY

According to various exemplary embodiments, systems, devices and methods are described to process timed text that is associated with television or other video programming. Pre-set data that describes the particular format of the timed text that is associated with a program is initially received and stored at the television receiver prior to receiving the program with encoded timed text. The timed text that is associated with the received program is interpreted according to the pre-set data previously stored at the television receiver, and the program with the interpreted timed text is output to a display for presentation to the viewer. The pre-set information may be provided for each program as part of an electronic program guide, for example, or as part of other data transmitted out of band within the broadband distribution system. Other embodiments may provide the pre-set formatting data in response to a request from the receiver device, or otherwise as desired.

Additional embodiments, aspects and other features are described in more detail below.

BRIEF DESCRIPTION OF THE DRAWING FIGURES

Figure 2:
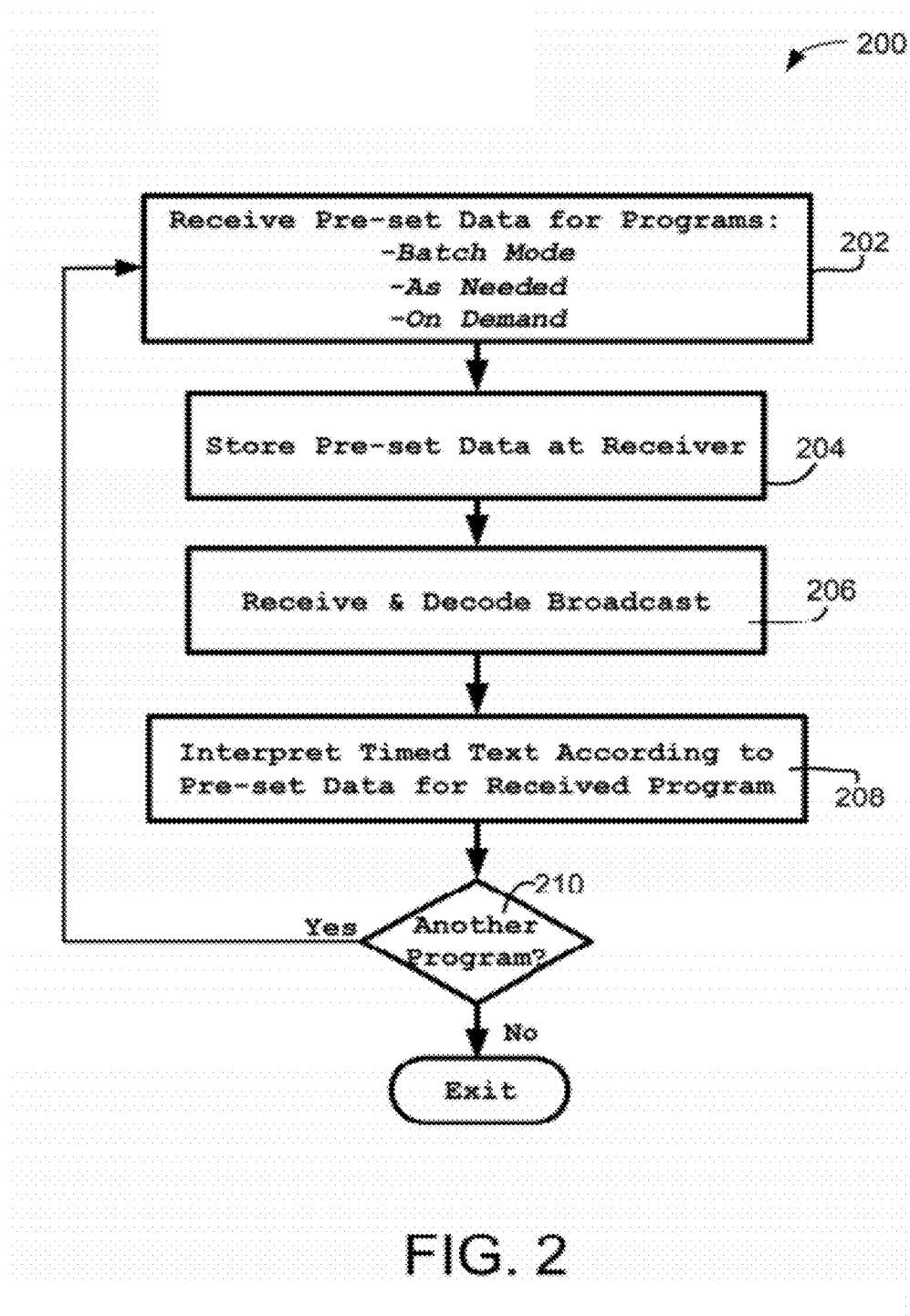
Figure 3:
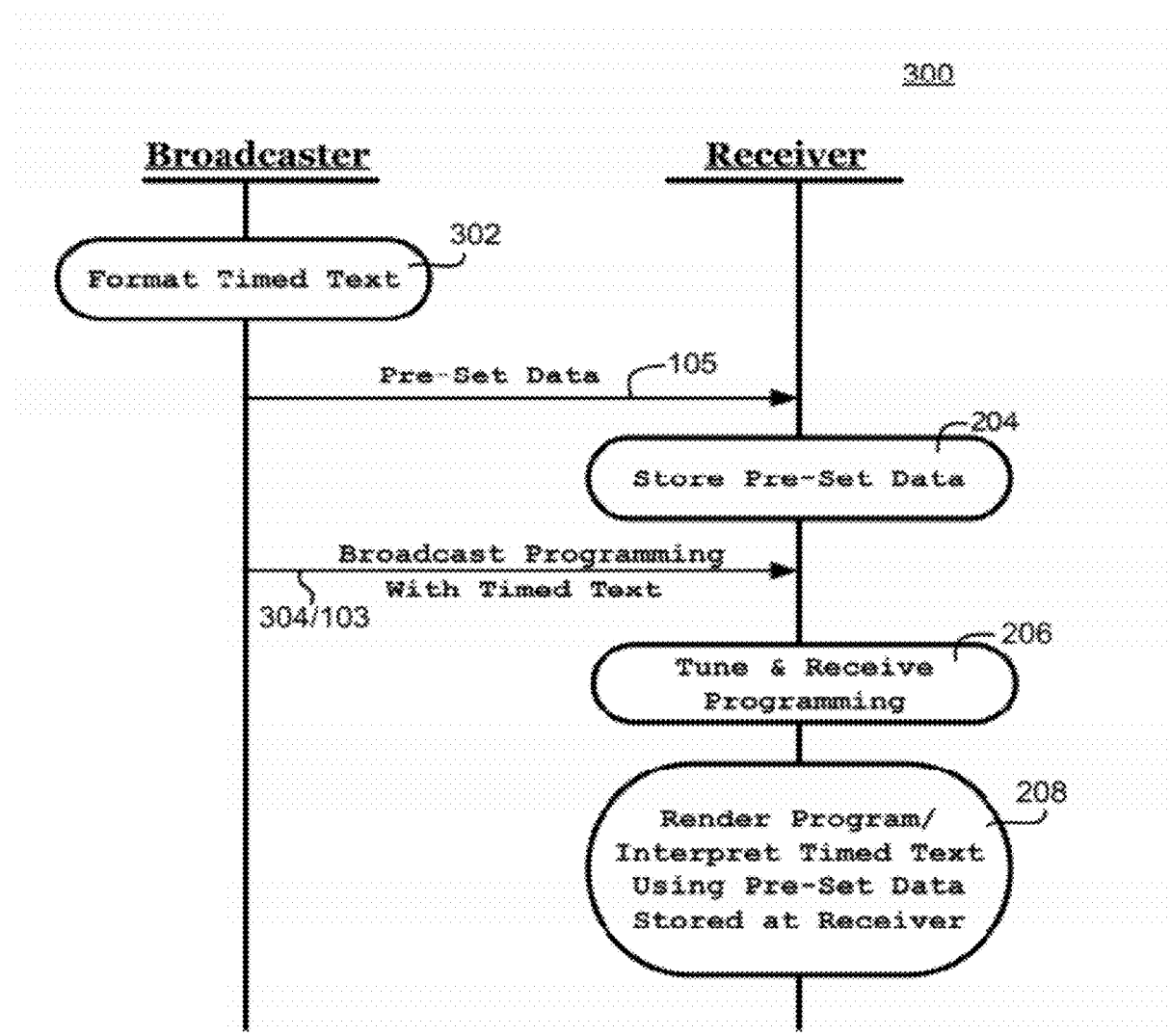

Exemplary embodiments will hereinafter be described in conjunction with the following drawing figures, wherein like numerals denote like elements, and FIG. 1 is a block diagram of an exemplary system for providing closed caption information in a timed text format using pre-set information;

FIG. 2 is a flowchart of an exemplary process for processing timed text information associated with a particular program; and FIG. 3 is a diagram showing an exemplary process for processing video content with timed text.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, formatting data about timed text associated with a television program, movie or other video content is pre-stored at the video player/receiver prior to receipt of the content itself. The pre-stored data allows the player/receiver to know the formatting of timed text associated with the program in advance so that the player can adequately interpret the timed text while rendering the program for output to the viewer. Each program may have its own unique timed text format in some embodiments, or some programs may share formatting data as appropriate. The pre-set formatting data may be provided according to a batch scheme (e.g., as part of an electronic program guide or other feature in which information about multiple programs is received simultaneously), or pre-set data may be obtained on any sort of as-needed basis, as described more fully below.

The pre-set data associated with a program allows the receiver to obtain a priori knowledge about the format of the timed text so that the timed text can be properly interpreted. To that end, the formatting of the timed text can be flexibly adjusted to accommodate any available information. Legacy data (such as data in conventional CEA-608 or CEA-708 formats), for example, can be simply encapsulated within a more current timed text format, with the pre-set data identifying the particular locations and structures of the legacy data. By processing the pre-set data, the receiver/player can readily locate and reconstruct the data, thereby allowing for convenient backward compatibility with any number of legacy formats.

Moreover, by providing pre-set data in advance of the program itself, the formatting metadata within a live broadcast can be reduced or even eliminated. That is, live broadcasts typically require the broadcaster to periodically (and frequently) transmit files containing header information in the broadcast metadata so that viewers tuning in to the broadcast at any time are able to quickly obtain the information needed to process the timed text associated with the broadcast. Otherwise, viewers tuning in mid-broadcast would be unable to process the timed text until the header information was re-transmitted.

Rather than relying upon the receiver to extract formatting metadata from the broadcast itself, some embodiments provide pre-set formatting data that is transmitted separately and in advance of the programming. Since the receiver has a priori knowledge of the timed text formatting from the pre-set data, there is no need to wait for the information to be broadcast within the program stream itself. This allows the receiver to interpret the timed text on a relatively immediate basis for any program that the viewer may select at anytime. Other embodiments may additionally or alternately retain the header data within the broadcast itself, but the header data could be augmented to provide additional pre-set information describing the format of the timed text.

Turning now to the drawing figures and with initial reference to FIG. 1, an exemplary system 100 for producing imagery having closed caption information suitably includes a production system 102, a distribution system 104, and/or a transmission system 106 as appropriate. Content with formatted timed text information 103, once created, is provided over any sort of broadcast or other distribution channel 108 for rendering at a media receiver no and playing on any sort of display 120. As shown in FIG. 1, timed text information 103 may be inserted into the programming at any stage of production 102, distribution 104 and/or transmission 106 to allow closed captioning to be presented in a desired format. The format of the timed text information can then be described in pre-set data 105 that can be provided to the receiver 110 in advance the program broadcast to allow appropriate interpretation of formatted timed text content 103.

Pre-set data 105 is any sort of template, schema or other data that describes the particular formatting of timed text 103. In various embodiments, formatting data 105 includes conventional header information (as described by the SMPTE-TT or another specification) or other information that allows receiver no to properly interpret the timed text 103 that accompanies video programming rendered by the receiver 110. Such information may include the sizes and locations of data fields, for example, or other information relating to the structure, size, arrangement or other formatting of the timed text 103. In various embodiments, timed text 105 also carries information related to the presentation of caption or other data, such as location of presentation on the screen, scrolling speed or time, pop on/off data, timing data, and/or the like. Such information may be defined within the pre-set data 105 as desired.

Timed text 103 and format data 105 may be created and formatted in any manner. Timed text 103 may be newly-created in some cases; in other cases, the timed text is extracted from legacy data (e.g., CEA-608 or CEA-708 closed caption data) and encapsulated within a different format (e.g., SMPTE-TT format). This extraction and encapsulation process may be automated, as desired. In such instances, the positions and lengths of the various legacy data fields can be defined in pre-set data 105 so that the ultimate viewer is able to re-extract and process the encapsulated data as desired. This encapsulation process allows a very high level of flexibility in retaining legacy data even as newer timed text formats are implemented.

In the exemplary embodiment illustrated in FIG. 1, production system 102, distribution system 104 and transmission system 106 represent any systems, devices and/or organizations capable of producing, distributing and/or transmitting program content, respectively. As noted above, closed caption information 103 may be inserted into the programming content in any manner at any stage of production, distribution and/or transmission. In various embodiments, timed text 103 is formatted and associated with the programming at the production stage 102 by an author, editor, producer or other party. Certain producers, distributors and/or broadcasters may have preferred formats 105 for timed text 103, and each may produce, distribute and/or broadcast content using their own formats 105. Format data 105 may change from program to program, or may be consistent for each producer, distributor, broadcaster or other entity. All of the programs broadcast on a particular channel, for example, may have common format data 105 that may nevertheless differ from the format data 105 used by another network.

Timed text 103 formatted in accordance with any sort of pre-set data 105 may be encoded into any sort of programming in any manner, such as during a conventional "post production" phase or the like. Insertion of timed text 103 during or just after production may be appropriate in any sort of programming, including cinema programming, television programming or any other programming that is delivered in any sort of standard format, such as any form of MPEG format that can be rendered by a player/receiver device 110. In other embodiments, however, timed text 103 may be added to programming during intermediate distribution 104 (e.g., encoding or transcoding of programming that is stored onto DVDs or other portable media, or otherwise distributed to network affiliates, broadcasters and/or any other parties). In still other embodiments, timed text 103 may be inserted into the program stream just prior to broadcast or other transmission 106, much as current caption data is encoded in many current television broadcasts. Timed text 103 may also be inserted prior to placeshifting or other streaming of a network video stream, or in any other setting as desired.

To that end, distribution channel 108 may represent any sort of data link, broadcast or other wireless connection, physical media, and/or other avenue for delivering programming content. Examples of distribution channels include, without limitation, broadcast television, very small aperture terminal (VSAT) satellite (e.g., for movie distribution), direct broadcast satellite (DBS), cable television, cellular or other wireless telephone networks, Internet or other data communications networks, and/or the like. Again, closed caption information 103 may be inserted into or otherwise encoded with programming content in any manner, and at any phase of production, post-production, distribution and/or delivery of the programming content. Indeed, caption data need not be provided with the video content itself, but rather may be retrieved from a separate server (e.g., server 132) and/or other source of information, as desired.

Receiver no is any device, component, circuitry or logic capable of receiving and processing video programming content. As shown in FIG. 1, receiver no includes a receiver interface 112, a controller 113 with appropriate processor 116 and memory 118 resources, and a display interface 114 as appropriate. In various embodiments, receiver 110 is a conventional television receiver (e.g., a set top box or other broadcast, satellite and/or cable television receiver) capable of receiving signals via distribution channel 108 and providing an output signal 115 that can be displayed to the viewer. In various embodiments, display 120 is any sort of television or other monitor that is capable of receiving a program signal 115 from a set-top box, decoder or other external receiver no as desired. Receiver no may be equivalently implemented as a DVD or other player that is capable of rendering content stored on any optical, magnetic and/or other portable media. In still other embodiments, receiver no is a media player capable of receiving media streams over a communications network (e.g., the Internet, a local or wide area network, and/or any sort of wireless telephony network). In such embodiments, receiver 110 may be a software program that executes on conventional computer hardware, such as a personal computer, personal digital assistant, mobile telephone, video game player and/or the like.

Receiver interface 112 is any hardware, firmware and/or software interface capable of receiving programming content. In various embodiments, receiver interface implements a demodulator/decoder feature for receiving and demodulating digital television programming over a broadcast, satellite, and/or cable programming link. In other embodiments, receiver interface 112 is a conventional network interface to a digital network such as the Internet, or any local area, telephone and/or other network having access to the Internet. As noted above, receiver interface 112 may equivalently receive programming from a DVD or other portable media, or any other source as desired.

The exemplary television receiver no illustrated in FIG. 1 also includes a storage medium 119, as appropriate. Storage medium 119 may be implemented as additional memory, as a disk drive, or in any other manner. Many embodiments may provide a digital video recorder (DVR) or other recording feature that allows content to be stored in storage medium 119 for later viewing. Such content may be stored with timed text information 103 to allow for decoding and viewing of content text at the time that the programming stored on the recorder is rendered. Although FIG. 1 shows electronic program guide data 124 and pre-set formatting data 105 stored within storage medium 119, equivalent embodiments could store this data in memory 118, and/or in any other memory, disk or other storage medium available to receiver 110.

Controller 113 is any sort of control logic or the like that interacts with receiver interface 112 and display interface 114 to output imagery to the viewer on display 120. Controller 113 also controls the reception, storage and processing of video content via receiver interface 112. To that end, controller 113 suitably directs the reception and storage of pre-set data 105, as well as the interpretation of timed text information 103 that is provided within received programming. Additional detail about such processing is provided below with respect to FIG. 2.

In various embodiments, controller 113 may be implemented using any sort of microprocessor, microcontroller, digital signal processor or other processor 116 capable of directing the actions and processes of receiver 110. Typically, processor 116 will be associated with any sort of memory 118, such as any sort of static, dynamic, flash or other memory capable of storing programming instructions and/or data for processing by processor 116. In various embodiments, receiver 110 is based upon a "system on chip" (SoC) implementation that incorporates a hybrid microcontroller 116 with memory 118, input/output and/or other features to perform the various signal processing and other actions of receiver 110. Various SoC and other integrated hardware implementations are available from Texas Instruments, Conexant Systems, Broadcom Inc., and many other suppliers as appropriate. Other embodiments may implement processor 116 and/or memory 118 using any sort of application specific integrated circuit (ASIC) or the like. Still other embodiments may implement processor 116 and/or the other features of receiver no with any number of discrete and/or integrated processing components (e.g., any sort of microprocessor or microcontroller), memories 118, input/output features and/or other features as desired.

Display interface 114 is any physical and/or logical interface to display 120. As noted above, in some implementations receiver no and display 120 are provided in an integrated product (e.g., a conventional television). In other embodiments wherein receiver no provides video output signals 115 to an external display 104, such signals 115 may be provided in any compatible format. In embodiments wherein display 120 is a conventional television, for example, display interface 114 may provide video output signals 115 in any conventional format, such as component video, composite video, S-video, High-Definition Multimedia Interface (HDMI, e.g., any version of the CEA-861 standards), Digital Visual Interface (DVI), IEEE 1394, universal serial bus (USB) and/or any other formats as desired.

Display 120 is any sort of television, monitor and/or other display capable of presenting video imagery 122 to a viewer. In various embodiments, display 120 operates in conjunction with receiver 110 to generate video imagery 122 in any manner. Other embodiments may combine the functions and components of receiver 110 and display 120 into a common housing, as in a conventional television with a built-in tuner or other receiver. In the example illustrated in FIG. 1, imagery 122 is generated with caption text 124 that is provided within timed text 103, as described by format data 105.

In practice, then, receiver no suitably receives television-type programming in any format or medium. The programming may be received at receiver interface 112 from any broadcast or other transmission source, from any sort of streaming or portable media source, and/or any other distribution channel 108. The programming is provided with (or at least associated with) timed text information 103 that includes caption or other information. This information 103 may be extracted from the programming stream, or from any other source as described herein, and interpreted according to the pre-set data 105 for the particular program that was previously received. Timed text and program content may be further processed in conjunction with any user preference or other information to generate suitable imagery on display 120 to thereby present the program and the timed text information to the viewer as desired.

The pre-set formatting data 105 may be delivered to the receiver no in any manner. In various embodiments, pre-set data 105 is provided through the same distribution channel 108 as the program itself, albeit at an earlier time. Data 105 may be delivered as part of the data associated with an electronic program guide 125, for example. Such data may be delivered via an out-of-band signal that is separate from programming signals, but using the same DBS, cable or other distribution channel 108 used to deliver the programming signals, as desired.

In other embodiments, data 105 and/or timed text 103 may be delivered from a separate source via a backchannel such as the Internet, a telephone link, and/or another data communications network. Such embodiments may provide pre-set formatting data 105 from a server 132 operating on the network that delivers data 105 in response to requests placed by receiver 110, as desired. Such requests may be posited on a batch or as-needed basis, as described more fully below.

With reference now to FIG. 2, an exemplary method 200 for processing timed text 103 at a video receiver such as receiver 110 suitably includes the broad functions of receiving pre-set data 105 for the particular program (function 202), storing the pre-set data for later use (function 204), subsequently receiving and decoding a program as part of a video broadcast or other distribution (function 206), and interpreting the timed text associated with the received program in accordance with the previously-stored pre-set formatting data (function 208). Method 200 may be repeated as needed for any number of different programs (function 210), as desired.

As noted above, receiver no is able to interpret timed text 103 associated with a received television program or other video content because it has a priori information about the timed text format in pre-set formatting data 105. This pre-set data 105 may be organized in any logical format, such as a template, an XML-type schema, a SMPTE-TT header format, or the like. In various embodiments, each particular program is associated with its own pre-set data. Alternatively, pre-set data 105 may be combined for multiple programs in some implementations, and/or individual programs (or groups of programs, e.g., programs appearing on a common channel, or different episodes of a common program) may have more custom and unique pre-set data 105 for the particular program(s).

Pre-set data may be received at any time, and according to any temporal basis (function 202). As shown in FIG. 2, pre-set data 105 may be obtained in batches, or in any sort of "as-needed" or "on-demand" basis, as appropriate. Batch processing could represent any technique for obtaining pre-set data 105 for multiple programs at the same time, such as providing the data 105 as part of a program guide or other regular download to receiver no from a broadcaster 106 or other source. To that end, pre-set data 105 may be received via an out-of-band channel separate from the programming content, but still part of a DBS, cable or other distribution channel 108. Other implementations may allow receiver no to request the pre-set data 105 from a service 132 available via the internet or another back channel, as desired. Still other embodiments could receive pre-set data 105 as part of a header or other structure provided at the beginning of on-demand or broadcast programming, and/or during any part of the program stream (which may be repeated at any desired frequency). Pre-set data 105 may therefore be provided automatically (e.g., as part of a regular batch download), in response to requests placed by the receiver 110, as part of a broadcast or on demand stream, and/or in any other manner as desired. In some implementations, the receiver no may assume certain default values for pre-set data 105 if no explicit pre-set data 105 is received. Such default values may be associated with the content provider, the programming channel, the program itself, the manufacturer of the receiver 110, the geographic region of the receiver 110, and/or any other factors as desired.

Pre-set data 105 is stored within receiver 110 as appropriate (function 204). As noted above, data 105 may be stored within memory 118, within storage medium 119, and/or in any other storage medium available to receiver 110 as desired.

Program content is received and decoded in any suitable manner (function 206). In various embodiments, broadcast content may be received by controlling a tuner within receiver 112 to select an appropriate channel containing programming desired by the viewer; this programming is received and decoded as appropriate (function 206). In various embodiments, content is received as an MPEG or similar multiplex that includes multiple component streams each containing video, audio, data or other information. In such embodiments, timed text 103 may be provided within a data stream, as desired, or in any other appropriate manner.

As noted previously, the timed text 103 associated with the particular program is interpreted using the information in pre-set format data 105 (function 208) that was previously stored within receiver 110. The format data 105 can be used to locate information, to decode information, or for any other purpose. As noted above, some embodiments could use format data 105 to describe an encapsulation wherein legacy data (e.g., EIA 608/708 data or the like) is contained within a timed text frame, thereby allowing for convenient extraction and decoding using conventional techniques. This encapsulation technique could be used to conveniently support existing programming that already contains caption data in a legacy format, since existing legacy data could simply flow as-is and converge later with the already existing timed text elements, as appropriate.

Generally speaking, the various functions and features of method 200 may be carried out with any sort of hardware, software and/or firmware logic that is stored and/or executed on any platform. Some or all of method 200 may be carried out, for example, by logic executing within receiver no in FIG. 1. In one embodiment, processor 116 executes software logic that performs each of the various functions shown in FIG. 2. Such logic may be stored in memory 118 or in any other storage available to processor 116 as desired. Hence, the particular logic and hardware that implements any of the various functions shown in FIG. 2 may vary from context to context, implementation to implementation, and embodiment to embodiment in accordance with the various features, scenarios and structures set forth herein. The particular means used to implement each of the various functions shown in FIG. 2, then, could be any sort of processing structures that are capable of executing conventional software logic in any format. Such processing hardware may include processor 116 or other components of receiver 110 in FIG. 2, as well as any other processors or other components associated with any conventional television, receiver, media player and/or the like.

FIG. 3 is a diagram showing an exemplary process for encoding and transmitting video content with timed text. As noted above, timed text 103 is formatted as desired by a broadcaster 106, distributor 104 and/or producer 102 prior to broadcast (function 302). The timed text 103 is described by pre-set data 105 that defines the various locations, lengths, formats and/or other parameters of the timed text 103. Legacy closed caption data in CEA-608 or CEA-708 format, for example, could be encapsulated within a SMPTE-TT or other format. In this example, the pre-set data 105 would specify the locations of the various data fields in sufficient detail to allow the receiving device no to appropriately extract and process the encapsulated data. In many embodiments, the timed text 103 is included within the programming 304 itself, e.g., as part of an MPEG multiplex. Other embodiments could maintain the timed text 103 separately from the rest of the programming 304, as desired.

The pre-set data 105 is provided to the receiving device 110 as appropriate. FIG. 3 shows broadcaster 106 transmitting the pre-set data 105 and the programming content 304 to the receiver device 110. As noted above, pre-set data 105 may be provided out-of-band as part of a program guide broadcast or the like, or the pre-set data 105 may be provided in-band at the beginning of a broadcast (or at any other suitable interval). The broadcast programming 304 and pre-set data 105 (which may be sent in-band or out-of-band) may be provided as part of a common broadcast across distribution channel 108. Although not expressly shown in FIG. 3, an alternate embodiment could provide caption data (including timed text 103 and/or pre-set data 105) from a separate source (e.g., server 132 in FIG. 1) other than the broadcast source that provides the video programming 304 itself.

The receiving device 110 is able to store the pre-set data 105 (function 204) and to receive the broadcast programming 304 as described above (function 206). The receiving device uses the a priori knowledge contained in the pre-set data 105 to process the timed text data 103 that is associated with programming 304 as desired (function 208). Timed text may be interpreted to provide closed captioning, subtitles, or any other information as desired when the broadcast programming 304 is rendered to the viewer (function 208).

Note that any number of alternate but equivalent implementations could be formulated in addition to the detailed examples that are set forth herein. Equivalent techniques could be incorporated into a placeshifting device such as any of the SLING products available from Sling Media of Foster City, Calif., for example. In such embodiments, caption data may be received and rendered at a placeshifting device, with the rendered caption data being provided within the place-shifted media stream. Alternately, timed text data 103 and/or format data 105 could be provided from the placeshifting device to a remotely-located media player (equivalent to receiver 110), as desired. Still other embodiments could allow a personal or other computer system to allocate resources to receiving and processing pre-set data that describes timed text associated with a streaming or downloaded video program. Many other equivalent embodiments could be formulated as desired.

The general systems, structures and techniques described above may be inter-combined, enhanced, modified and/or otherwise implemented to provide any number of different features. Although the preceding discussion focuses primarily on broadcast sources of television, for example, equivalent embodiments could apply the same features in any other context, including any sort of satellite, cable, terrestrial or other transmittable format, as well as any sort of stored media format (e.g., DVD, including conventional DVD formats as well as any sort of BLU-RAY or other high definition disk format), streaming video format (e.g., streaming video over the Internet or another network, as well as streaming over a telephone or other wireless network), cinema format and/or the like.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method executable by a television receiver to process timed text that is associated with television programming, the method comprising:
   receiving, at the television receiver, a broadcast signal comprising pre-set data associated with a particular program, wherein the pre-set data provides a priori knowledge about the particular format of the timed text subsequently broadcast as part of the particular television program, wherein the pre-set data is received at the television receiver as an out-of-band signal that is separate from the subsequent broadcast that delivers the particular television program to the television receiver;
   storing the pre-set data at the television receiver prior to receiving the particular television program at the television receiver;
   after storing the pre-set data, receiving the subsequent broadcast that delivers the particular television program and its associated timed text at the television receiver;
   formatting the received timed text that is associated with the received program according to the previously-received pre-set data describing the particular format of the timed text that was previously stored at the television receiver to thereby combine the interpreted timed text with the received program; and
   outputting the particular television program and its associated interpreted timed text to a display for presentation.

2. The method of claim 1 wherein the particular format of the timed text is a SMPTE-TT timed text format.

3. The method of claim 2 wherein the pre-set data describes a format to encapsulate legacy closed caption text into the SMPTE-TT timed text format.

4. The method of claim 3 wherein the legacy format is a CEA-608 format.

5. The method of claim 3 wherein the legacy format is a CEA-708 format.

6. The method of claim 1 wherein the particular format varies from program to program, and wherein the pre-set data is associated with a specific television program so that the pre-set data describes the particular format for that particular program.

7. The method of claim 6 wherein the pre-set data is received with electronic program guide data transmitted to the television receiver.

8. The method of claim 6 wherein the pre-set data is received in a batch that comprises the pre-set data for each of a plurality of programs.

9. The method of claim 1 wherein the receiving comprises receiving the pre-set data as data associated with an electronic program guide executing on the television receiver.

10. The method of claim 1 wherein the receiving comprises receiving the pre-set data with a firmware update to the television receiver.

11. The method of claim 1 further comprising requesting the pre-set data from a server, and wherein the pre-set data is received at the television receiver in response to the request for the pre-set data.

12. A television receiver device to provide television programming to a display for presentation to a viewer, the television receiver comprising:
- a data storage;
- a receiver configured to receive the television programming;
- a display interface configured to provide output signals to the display; and
- a controller configured to receive pre-set information that describes a particular format of timed text that is associated with a particular program in a first broadcast, to store the pre-set data in the data storage prior to receiving the particular program, to receive the particular program and its associated timed text via the receiver in a subsequent broadcast that is separate from the first broadcast, to format the timed text that is associated with the received program according to the previously-stored pre-set data, and to output the program with the formatted timed text to the display for presentation to the viewer.

13. The television receiver device of claim 12 wherein the pre-set information is received via an out-of-band transmission apart from the television programming.

14. The television receiver device of claim 13 wherein the out-of-band transmission is associated with an electronic program guide feature provided by the television receiver device.

15. The television receiver device of claim 12 wherein the pre-set information is received via the same receiver as the television programming.

16. The television receiver device of claim 12 further comprising a network interface to a digital communications network, and wherein the pre-set information is received via the network interface from a server operating on the digital communications network.

17. The television receiver device of claim 12 wherein the particular format described by the pre-set information is a CEA-608 or CEA-708 format encapsulated within a SMPTE-TT format.

* * * * *